(12) United States Patent
Reed et al.

(10) Patent No.: US 7,765,478 B2
(45) Date of Patent: Jul. 27, 2010

(54) SCHEDULING AND RESERVING VIRTUAL MEETING LOCATIONS IN A CALENDARING APPLICATION

(75) Inventors: Michael Reed, Austin, TX (US); Linda J. Scott, Georgetown, TX (US); Robert V. Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 11/671,708

(22) Filed: Feb. 6, 2007

(65) Prior Publication Data
US 2008/0189619 A1 Aug. 7, 2008

(51) Int. Cl.
*G06F 15/00* (2006.01)
*G06F 13/00* (2006.01)
(52) U.S. Cl. ...................... 715/706; 715/748
(58) Field of Classification Search ......... 715/763–765, 715/853–855, 740–743, 738, 706
See application file for complete search history.

(56) References Cited

U.S. PATENT DOCUMENTS 6,381,580 B1  4/2002 Levinson
2002/0194048 A1  12/2002 Levinson
2004/0143573 A1  7/2004 Burkey et al.

OTHER PUBLICATIONS

"Statement in accordance with the Notice from the European Patent Office dated Oct. 1, 2007 concerning business methods" (OJ Nov. 2007; pp. 592-593), XP002456414, 3 pages.

*Primary Examiner*—Cao (Kevin) Nguyen
(74) *Attorney, Agent, or Firm*—Stephen R. Tkacs; Stephen J. Walder, Jr.; Steven L. Bennett

(57) ABSTRACT

A mechanism is provided for scheduling and reserving virtual meeting locations in a calendaring application. Participants use a calendaring application to schedule meetings. If the meeting takes place in a location within the virtual persistent world, then the calendaring application sends the meeting information, including virtual user IDs of the invitees, meeting location, and other virtual world requirements or parameters for the meeting, to a software agent. The software agent receives the meeting information and generates a script for creating the meeting location and a script for destroying the meeting location.

22 Claims, 4 Drawing Sheets

SCHEDULING AND RESERVING VIRTUAL MEETING LOCATIONS IN A CALENDARING APPLICATION

BACKGROUND

1. Technical Field

The present application relates generally to an improved data processing system and method. More specifically, the present application is directed to a method, apparatus, and computer program product for scheduling and reserving virtual meeting locations in a calendaring application.

2. Description of Related Art

There has been a surge in the popularity of three-dimensional (3D) virtual world environments. A massively multiplayer online role playing game (MMORPG) is an online computer or console game in which a large number of players interact with one another in a virtual world. As in all role playing games (RPGs), players assume the role of a character and take control over most of that character's actions. The virtual world may be a fantasy setting, a science fiction universe, or the old west, for example. With the rising acceptance of person computers, as well as increased graphical capabilities of personal computers and video game consoles, massively multiplayer online role playing games have become wildly popular around the world. In fact, part of the draw of massively multiplayer online role playing games is that players from any continent may be online at any given time.

Other vehicles for social interaction on the Internet have also become popular, such as chat rooms, message boards, instant messaging clients, Web logs (blogs), photo blogs, and the like. The idea of virtual world environments has expanded beyond role playing games. Popular virtual world environments today provide a manner in which users can interact in a "virtual world" that is not necessarily very different from the "real world." Users may create an avatar that represents them in the virtual world. Users may then create an apartment, buy clothing, decorate their apartments, meet with other users, trade items, create items, etc., all within the virtual world.

One popular virtual world application is the Second Life® online virtual world, which has more than one million members and more people and companies joining every day. "SECOND LIFE" is a registered trademark of Linden labs, Inc. One of the uses of these three dimensional virtual world environments is to allow for people from around the world to have places where they can meet. Business entities have created large auditoriums and meeting rooms within these worlds to allow for meetings between colleagues.

SUMMARY

In one illustrative embodiment, a method is provided for scheduling and reserving virtual meeting locations in a virtual world. The method comprises receiving meeting parameters for a meeting in a virtual meeting location from a calendar client application, generating a creation script based on the meeting parameters, and before a scheduled time for the meeting, executing the creation script on a virtual world server to create a virtual meeting location within the virtual world.

In another illustrative embodiment, an apparatus is provided for virtual meeting location scheduling and reservation. The apparatus comprises a processor and a memory coupled to the processor. The memory contains instructions which, when executed by the processor, cause the processor to receive meeting parameters for a meeting in a virtual meeting location from a calendar client application and generate a creation script based on the meeting parameters that is configured to execute on a virtual world server to create a virtual meeting location within the virtual world.

In a further illustrative embodiment, a virtual meeting location scheduling and reservation system comprises a software agent and a virtual world server. The software agent is configured to receive meeting parameters for a meeting in a virtual meeting location from a calendar client application and generate a creation script that is configured to execute on the virtual world server to create a virtual meeting location within the virtual world.

In yet another illustrative embodiment, a computer program product is provided comprising a computer useable medium having a computer readable program. The computer readable program, when executed on a computing device, causes the computing device to receive meeting parameters for a meeting in a virtual meeting location from a calendar client application and generate a creation script based on the meeting parameters that is configured to execute on a virtual world server to create a virtual meeting location within the virtual world.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE ILLUSTRATIVE EMBODIMENTS

Figure 1:
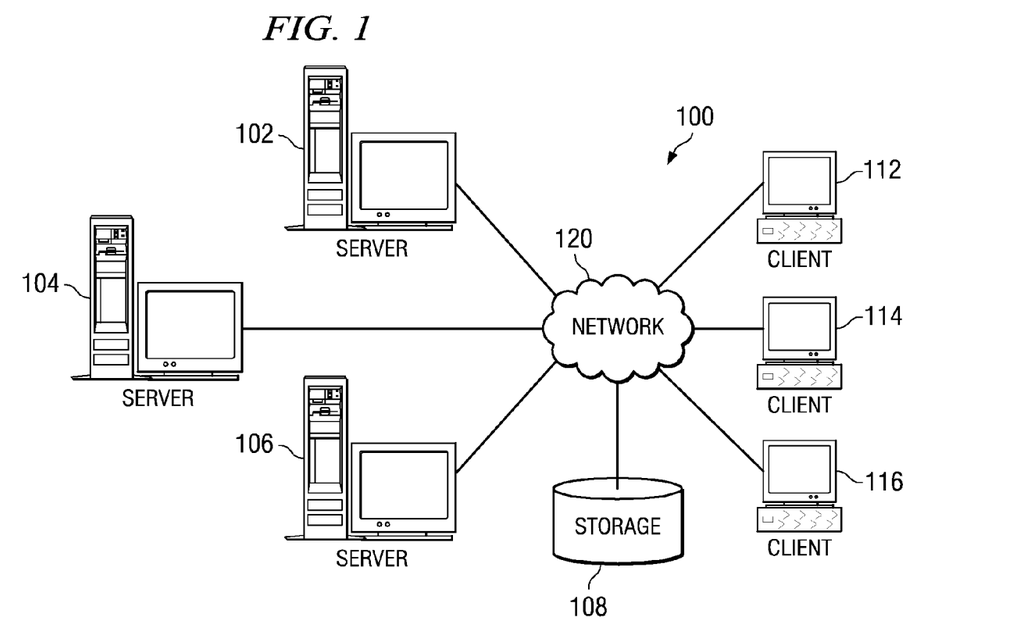
FIG. 1 depicts a pictorial representation of an exemplary distributed data processing system in which aspects of the illustrative embodiments may be implemented.
Figure 2:
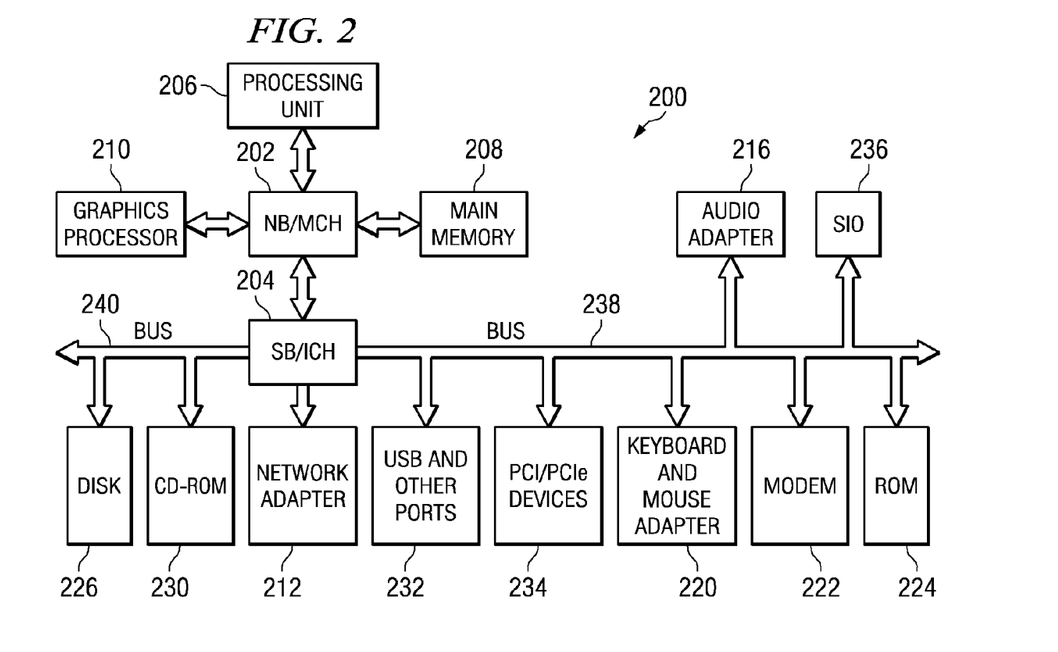
FIG. 2 is a block diagram of an exemplary data processing system in which aspects of the illustrative embodiments may be implemented.

The illustrative embodiments described hereafter provide a mechanism for scheduling and reserving virtual meeting locations in a calendaring application. As such, the illustrative embodiments may be implemented in a distributed data processing environment in which multiple computing devices are utilized along with one or more data networks. Accordingly, FIGS. 1 and 2 hereafter are provided as examples of a distributed data processing environment and computing devices in which exemplary aspects of the illustrative embodiments may be implemented. FIGS. 1 and 2 are only exemplary and are not intended to state or imply any limitation with regard to the types and/or configurations of computing devices in which the illustrative embodiments may be implemented. Many modifications to the computing devices and environments depicted in FIGS. 1 and 2 may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 120, which is the medium used to provide communication links between various devices and computers connected together within distributed data processing system 100. The network 120 may include connections, such as wire, wireless communication links, or fiber optic cables.

In the depicted example, servers 102, 104, and 106 are connected to network 120 along with storage unit 108. In addition, clients 112, 114, and 116 are also connected to network 120. These clients 112, 114, and 116 may be, for example, personal computers, network computers, or the like. In the depicted example, server 102 may provide data, such as boot files, operating system images, and applications to the clients 112, 114, and 116. In this instance, clients 112, 114, and 116 are clients to server 102 in the depicted example. Distributed data processing system 100 may include additional servers, clients, and other devices not shown.

More particularly, distributed data processing system 100 may provide a virtual persistent world environment. Server 102 may provide a virtual world server for maintaining a persistent virtual world for clients 112, 114, 116. A persistent virtual world is a representation of an environment with which participants interact. The virtual world is persistent because the environment continues to exist and evolve even when a given participant is not logged in. Server 102 may run virtual world server software and maintain a database in storage 108 to track the states of objects, structures, and characters in the persistent virtual world.

Clients 112, 114, 116 may run virtual world client software that a participant uses to interact with the persistent virtual world. Clients 112, 114, 116 may render a two-dimensional or three-dimensional representation of the persistent virtual world, although clients 112, 114, 116 may also represent the virtual world using text, as in earlier multi-user dungeons (MUDs). The participant typically interacts with the virtual world on behalf of, or from the perspective of, the participant's character. In three-dimensional game environments, the participant's character is represented by a three-dimensional player model. A significant draw of three-dimensional multiplayer online games is the ability to customize the appearance of the player model, which is also referred to as an "avatar." The participants may initially customize the appearance of the player model by selecting facial features, body style, hair color, hair style, facial hair, and the like. Throughout the virtual world experience, the player model may evolve, just as the virtual world itself evolves.

The participant is considered online when the participant is logged into the virtual world server through a virtual world client. While online, participants may interact with the virtual world through commands, keystrokes, or mouse clicks. For example, a common user interface for massively multiplayer online role playing games is the WASD interface, where the virtual world is rendered from the perspective of the participant's character and the "W" key moves the character forward, the "A" key turns the character left, the "S" key moves the player backward, and the "D" key moves the player right. Other user interfaces may use the cursor keys, mouse look, a top-down third-party perspective, a chase camera perspective, or other known interface techniques.

Whenever a participant's character interacts with the virtual world, an event is generated and sent to the virtual world server, e.g., server 102. For instance, if a participant at client 112 waves to the character of the participant at client 114, an event is generated at client 112 and sent to server 102. Server 102 then generates an event and sends it to client 114. Server 102 also keeps track of the position, orientation, and status of each structure, character, and item. The evolution of the virtual world is the result of events. A database contains the current state of the virtual world. The events cause changes to the virtual world and, thus, the database. The role of the virtual world client is essentially to represent these events graphically (or textually) to allow the participant to monitor for events that are relevant to that participant's character and to perform appropriate actions by interacting with the virtual world client.

In one exemplary embodiment, a participant at client 112, for example, may also run a calendaring application to schedule a meeting. If the meeting takes place in a real location, then the calendaring application processes the meeting invite as normal. However, if the meeting takes place in a location within the virtual persistent world, then the calendaring application sends the meeting information, including virtual user IDs of the invitees, meeting location, and other virtual world requirements or parameters for the meeting, to a software agent. The software agent may run on client 112, server 104, or another device within distributed data processing system 100. For example, the software agent may be part of the calendar application, the virtual world client application, or the virtual world server application.

The software agent receives the meeting information and generates a creation script for creating the meeting location and a destruction script for destroying the meeting location. The creation script may create the meeting location itself, which may be a building, a room, an island, or the like. In addition, the creation script may create instances of objects that are needed for the meeting, such as chairs, tables, podiums, etc. Before the meeting, the meeting owner may log into the virtual persistent world and run the creation script. Alternatively, the software agent may send the creation script directly to the virtual world server, such as server 102, to be executed automatically, without intervention from the meeting owner. At the conclusion of the meeting, the virtual world server may run the destruction script to break down the meeting place back into objects.

In the depicted example, distributed data processing system 100 is the Internet with network 120 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 102 or client 112 in FIG. 1, in which computer usable code or instructions implementing the processes for illustrative embodiments may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, video game consoles, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
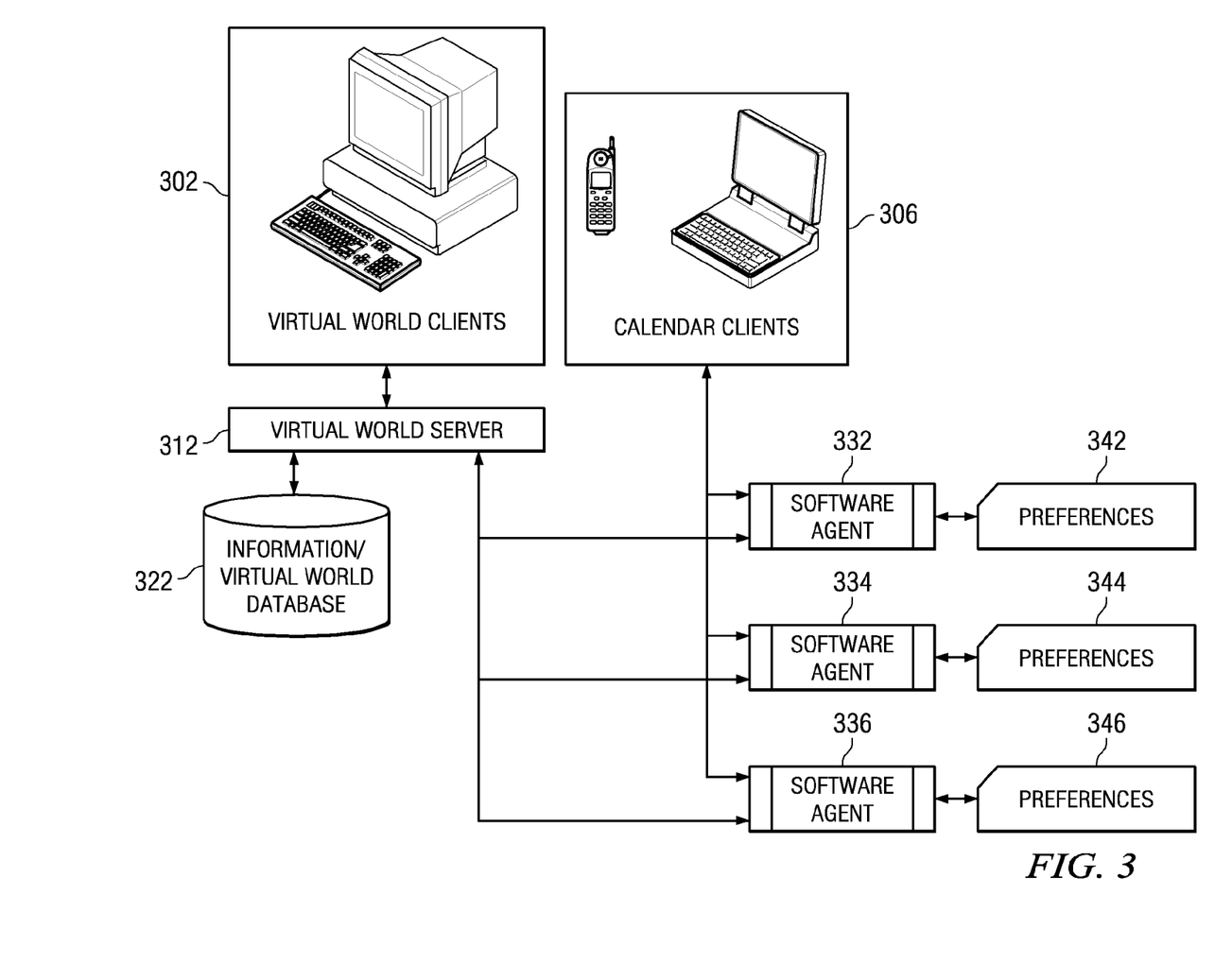
FIG. 3 is a block diagram illustrating a virtual persistent world environment in accordance with an exemplary embodiment.

FIG. 3 is a block diagram illustrating a virtual persistent world environment in accordance with an exemplary embodiment. Virtual world server 312 provides a virtual world environment to virtual world clients 302. Participants interact with the persistent virtual world through virtual world clients 302, which may provide text-based or graphical user interfaces for representing the persistent virtual world to the participant. Current popular virtual world clients represent virtual worlds as three-dimensional environments. The persistent world may be, for example, a medieval fantasy setting, a futuristic science fiction universe, the old west, a super hero universe, or any other environment that is suitable for a virtual world application.

Virtual world clients 302 may be, for example, personal computers or video game consoles. Personal computers, as referred to herein, may include desktop computers, laptop computers, or any other computing device that is capable of running a game client application. A video game console is a specialized computing device that is used to play video games. The game software itself may be available on a compact disc (CD) or digital video disc (DVD). Earlier game machines used cartridges containing read only memory (ROM) chips. Although video game consoles may be powered by similar processor chips as desktop computers, the hardware is under the entire control of the respective manufacturer, and the software is specific to the machine's capabilities. Video game consoles may also include handheld video game devices, which are self-contained devices with audio capabilities and displays built-in.

As the persistent virtual world evolves through interaction by the participants and other events, such as scripted actions by non-player characters (NPCs), virtual world server 312 observes the interactions and may generate events. The results of the events are then recorded in information/virtual world database 322. Events are also broadcast to all of the online participants affected by the events within virtual world clients 302. In most current implementations, the persistent virtual world is divided into "zones." Thus, while there may be over 2,000 participants online at a given time, there may only be 200 participants in a particular zone. Therefore, when an event occurs in that zone, such as a participant typing a message to be viewed by other participants in the area, virtual world server 312 may broadcast the event to only the participants in that zone. A person of ordinary skill in the art will recognize that the manner in which events are distributed to online participant clients is not a focus of this disclosure.

Calendaring tools exist today that allow people to set up and schedule real world meetings, Web conferences, and conference calls. Calendaring tools even allow people to reserve real world meeting rooms in the tools themselves. However, current calendaring tools do not provide any integration with a virtual world environment.

In virtual world environments, participants have the option of purchasing private locations of different sizes and to create groups that are allowed to use these locations. For example, a participant may create an IBM Meeting Place Island, restricted to a group called IBMers.

In accordance with an illustrative embodiment, a participant may use one of calendar clients 306 to schedule meetings. If the meeting takes place in a real location, then the calendar clients 306 processes the meeting invite as normal. However, if the meeting takes place in a location within the virtual persistent world, then calendar clients 306 send the meeting information, including virtual user IDs of the invitees, meeting location, and other virtual world requirements or parameters for the meeting, to one of software agents 332, 334, 336.

Software agents 332, 334, 336 receive meeting information and generate creation scripts for creating meeting locations and a destruction scripts for destroying meeting locations. The creation script may create the meeting location itself, which may be a building, a room, an island, or the like. In addition, the creation script may create instances of objects that are needed for the meeting, such as chairs, tables, podiums, etc. Before the meeting, the meeting owner may log into virtual world server 312 using one of virtual world clients 302 and run the creation script. Alternatively, the software agent, such as software agent 332, may send the creation script directly to virtual world server 312 to be executed automatically, without intervention from the meeting owner. At the conclusion of the meeting, virtual world server 312 may run the destruction script to break down the meeting place back into objects.

Software agents 332-336 may be separate software components that run on virtual world clients 302 or calendar clients 306. Alternatively, software agents 332-336 may be integrated within virtual world client software on virtual world clients 302 or may be integrated within calendaring applications within calendar clients 306. In another exemplary embodiment, software agents 332-336 may be integrated within the virtual world server application running on virtual world server 312. Furthermore, virtual world client software and calendar application software may run on the same client device.

In one exemplary embodiment, software agents 332, 334, 336 may load preferences 342, 344, and 346, respectively. Software agent 332, for example, may generate a creation script based on information in preferences 342. For instance, preferences 342 may be associated with a particular participant and may contain meeting location parameters that are specific to that participant. As an example, the participant may prefer a meeting location with certain décor, color scheme, meeting facilities, etc.

Figure 4:
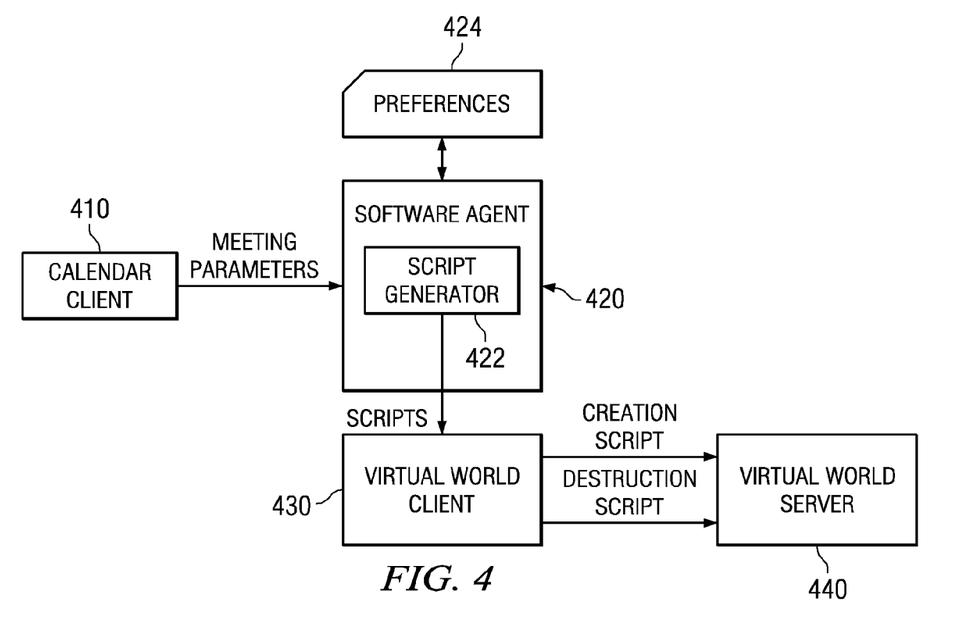
FIGS. 4 and 5 are block diagrams illustrating the functional components of exemplary virtual meeting location scheduling and reservation systems in accordance with illustrative embodiments.
Figure 5:
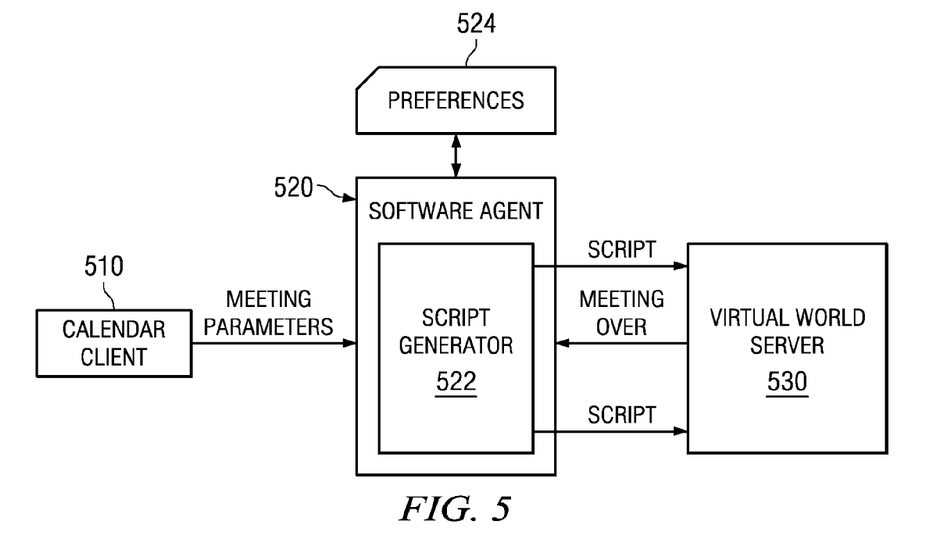

FIGS. 4 and 5 are block diagrams illustrating the functional components of exemplary virtual meeting location scheduling and reservation systems in accordance with illustrative embodiments. With reference to FIG. 4, a participant schedules a meeting using calendar client 410, which sends meeting parameters to software agent 420. The meeting parameters may include identifications of the meeting participants, which may be real world IDs, virtual user IDs, or both, a location within the virtual persistent world, and virtual world objects required for the meeting.

Some existing virtual world services provide a scripting language that may be used to attach behaviors to objects found within the virtual world. The Second Life® online virtual world has its own scripting language called Linden Scripting Language (LSL), for example. In accordance with the illustrative embodiment, software agent 420 includes script generator 422. Based on the meeting parameters and preferences 424, script generator 422 generates a creation script, for creating all the necessary object instances for the virtual meeting place, and a destruction script, for breaking down the meeting place back into objects. Software agent 420 sends the creation script and the destruction script to virtual world client 430, which may be associated with the same user, the meeting owner, as calendar client 410.

Before the meeting, the meeting owner may log into virtual world server 440 using virtual world client 430. The meeting owner may then run the creation script to create the customized virtual meeting place. Once the meeting is over, the meeting owner may run the destruction script to break the meeting place back into objects and/or to return those objects to their storage locations. The scripts may run on the virtual world client 430, creating events that are sent to virtual world server 440. Alternatively, the scripts may be initiated on virtual world client 430, but actually run on virtual world server 440.

In an alternative embodiment, a software agent may run the creation script and destruction script directly on the virtual world server without interaction from the meeting owner. Turning to FIG. 5, a participant schedules a meeting using calendar client 510, which sends meeting parameters to software agent 520. The meeting parameters may include identifications of the meeting participants, which may be real world IDs, virtual user IDs, or both, a location within the virtual persistent world, and virtual world objects required for the meeting.

In accordance with the illustrative embodiment, software agent 520 includes script generator 522. Based on the meeting parameters and preferences 524, script generator 522 generates a creation script, for creating all the necessary object instances for the virtual meeting place, and a destruction script, for breaking down the meeting place back into objects. Before the meeting, software agent 520 runs the creation script on virtual world server 530. Software agent 520 may include a timer and may allow the meeting owner to schedule the initiation of the creation script. Alternatively, virtual world server 530 may allow software agent 520 to schedule execution of the creation script.

Once the meeting is over, virtual world server 530 may send an event notification to software agent 520 indicating that the meeting has concluded. Software agent 520 may then run the destruction script on virtual world server 530 to break the meeting place back into objects and/or to return those objects to their storage locations. Again, software agent 520 may execute the destruction script according to a timer/scheduler or may schedule execution of the destruction script with virtual world server 530. For example, software agent 520 may instruct virtual world server 530 to execute the destruction script a predetermined amount of time after the conclusion of the meeting.

Figure 6:
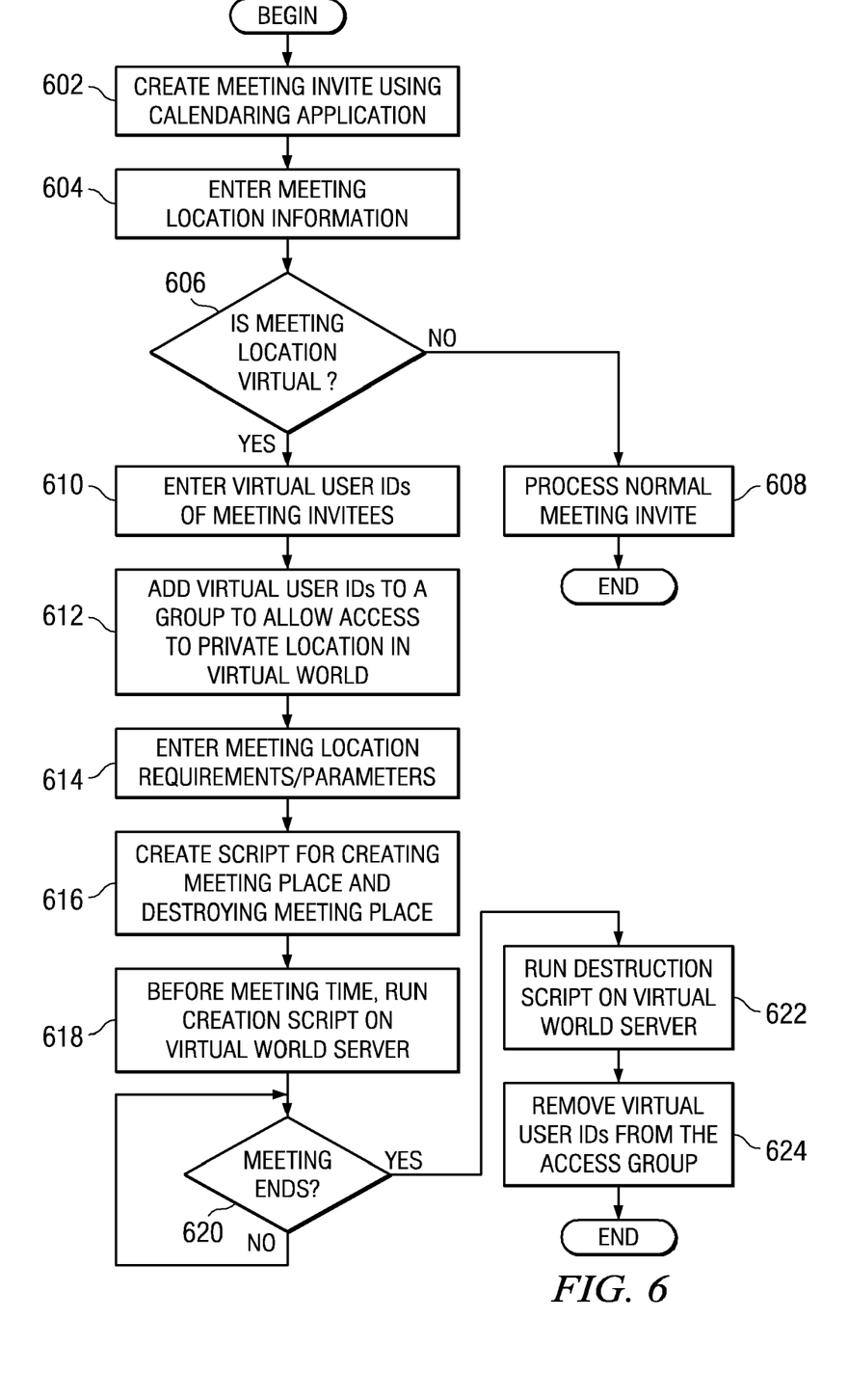
FIG. 6 is a flowchart illustrating operation of a virtual meeting location scheduling and reservation system in accordance with an illustrative embodiment.

FIG. 6 is a flowchart illustrating operation of a virtual meeting location scheduling and reservation system in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be embodied in a computer-readable memory, storage medium, or transmission medium that can direct a processor or other programmable data processing apparatus to function in a particular manner, such that the instructions stored in the computer-readable memory, storage medium, or transmission medium produce an article of manufacture including instruction means that implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

With particular reference to FIG. 6, operation begins and a user initiating a meeting creates a meeting invite using a calendaring application (block 602). The user enters meeting location information (block 604). The calendaring application determines whether the meeting location is a virtual location or a real location (block 606). If the meeting location is not a virtual location, the calendaring application processes a normal meeting invite (block 608). Thereafter, operation ends.

If the meeting location is a virtual location in block 606, the user enters the virtual identifiers (IDs) of the meeting invitees (block 610). The system adds the virtual user IDs to a group to allow access to a private location in the virtual world (block 612). Then, the user enters meeting location requirements and parameters (block 614). Some meeting location requirements and parameters may be based on the number of participants or preferences of the user; however, the user may enter further requirements and parameters, such as a particular décor, a chosen color scheme, tools needed for the meeting, and the like.

Next, the software agent creates a script for creating the meeting place and a script for destroying the meeting place (block 616). Before the meeting time, the user or the software agent runs the creation script on the virtual world server (block 618). The system determines whether the meeting has ended (block 620). This determination may be made by the software agent, the virtual world server, or the user, as discussed above. If the meeting has not ended, operation returns to block 620 until the meeting is over.

If the meeting has ended in block 620, the user or software agent runs the destruction script on the virtual world server (block 622). The system removes the virtual user IDs from the access group (block 624). Thereafter, operation ends.

Thus, the illustrative embodiments solve the disadvantages of the prior art by providing a mechanism for scheduling and reserving virtual meeting locations in a calendaring application. Participants use a calendaring application to schedule meetings. If the meeting takes place in a location within the virtual persistent world, then the calendaring application sends the meeting information, including virtual user IDs of the invitees, meeting location, and other virtual world requirements or parameters for the meeting, to a software agent. The software agent receives the meeting information and generates a script for creating the meeting location and a script for destroying the meeting location.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for scheduling and reserving virtual meeting locations in a virtual world, the method comprising:
   receiving meeting parameters for a meeting in a virtual meeting location from a calendar client application;
   generating a creation script based on the meeting parameters; and
   before a scheduled time for the meeting, executing the creation script on a virtual world server to create a virtual meeting location within the virtual world,
   wherein generating the creation script is performed by a software agent, wherein the software agent sends the creation script to a virtual world client associated with a meeting owner, and wherein the meeting owner performs the step of executing the creation script on the virtual world server using the virtual world client.

2. The method of claim 1, wherein the meeting parameters comprise one or more virtual user identifications, the method further comprising:
   adding the one or more virtual user identifications to a group to allow access to the virtual meeting location.

3. The method of claim 1, wherein the meeting parameters comprise at least one of color scheme, objects to be placed in the virtual meeting location, or tools to be used in the meeting.

4. The method of claim 1, further comprising:
   generating a destruction script; and after the conclusion of the meeting, executing the destruction script on the virtual world server to break down the virtual meeting location within the virtual world.

5. The method of claim 1, wherein generating a creation script comprises:
receiving a set of user preferences; and
generating the creation script based on the meeting parameters and the set of user preferences.

6. An apparatus for virtual meeting location scheduling and reservation, the apparatus comprising:
a processor; and
a memory coupled to the processor, wherein the memory contains instructions which, when executed by the processor, cause the processor to:
receive meeting parameters for a meeting in a virtual meeting location from a calendar client application; and
generate a creation script based on the meeting parameters that is configured to execute on a virtual world server to create a virtual meeting location within the virtual world,
wherein generating the creation script is performed by a software agent, wherein the software agent sends the creation script to a virtual world client associated with a meeting owner, and wherein the meeting owner performs the step of executing the creation script on the virtual world server using the virtual world client.

7. The apparatus of claim 6, wherein the meeting parameters comprise one or more virtual user identifications, and wherein the instructions, when executed by the processor, further cause the processor to:
add the one or more virtual user identifications to a group to allow access to the virtual meeting location.

8. The apparatus of claim 6, wherein the meeting parameters comprise at least one of color scheme, objects to be placed in the virtual meeting location, or tools to be used in the meeting.

9. The apparatus of claim 6, wherein the instructions, when executed by the processor, further cause the processor to:
generate a destruction script that is configured to execute on the virtual world server to break down the virtual meeting location within the virtual world.

10. The apparatus of claim 6, wherein generating a creation script comprises:
receiving a set of user preferences; and
generating the creation script based on the meeting parameters and the set of user preferences.

11. A virtual meeting location scheduling and reservation system, the system comprising:
a software agent;
a virtual world server; and
a virtual world client associated with a meeting owner,
wherein the software agent is configured to receive meeting parameters for a meeting in a virtual meeting location from a calendar client application, and generate a creation script that is configured to execute on the virtual world server to create a virtual meeting location within the virtual world,
wherein the software agent sends the creation script to the virtual world client associated with the meeting owner and wherein the meeting owner performs the step of executing the creation script on the virtual world server using the virtual world client.

12. The system of claim 11, wherein the meeting parameters comprise one or more virtual user identifications, wherein the software agent is configured to add the one or more virtual user identifications to a group to allow access to the virtual meeting location.

13. The system of claim 11, wherein the meeting parameters comprise at least one of color scheme, objects to be placed in the virtual meeting location, or tools to be used in the meeting.

14. The system of claim 11, wherein the software agent is further configured to generate a destruction script that is configured to execute on the virtual world server to break down the virtual meeting location within the virtual world.

15. The system of claim 14,
wherein the software agent is configured to send the destruction script to the virtual world client associated with a meeting owner.

16. The system of claim 11, wherein the software agent receives a set of user preferences and generates the creation script based on the meeting parameters and the set of user preferences.

17. The system of claim 11, wherein the software agent is part of the calendar client application or the virtual world server.

18. A computer program product comprising a computer useable medium having a computer readable program, wherein the computer readable program, when executed on a computing device, causes the computing device to:
receive meeting parameters for a meeting in a virtual meeting location from a calendar client application; and
generate a creation script based on the meeting parameters that is configured to execute on a virtual world server to create a virtual meeting location within the virtual world,
wherein generating the creation script is performed by a software agent, wherein the software agent sends the creation script to a virtual world client associated with a meeting owner, and wherein the meeting owner performs the step of executing the creation script on the virtual world server using the virtual world client.

19. The computer program product of claim 18, wherein the meeting parameters comprise one or more virtual user identifications, and wherein the computer readable program, when executed on the computing device, further causes the computing device to:
add the one or more virtual user identifications to a group to allow access to the virtual meeting location.

20. The computer program product of claim 18, wherein the meeting parameters comprise at least one of color scheme, objects to be placed in the virtual meeting location, or tools to be used in the meeting.

21. The computer program product of claim 18, wherein the computer readable program, when executed on the computing device, further causes the computing device to:
generate a destruction script that is configured to execute on the virtual world server to break down the virtual meeting location within the virtual world.

22. The computer program product of claim 18, wherein generating a creation script comprises:
receiving a set of user preferences; and
generating the creation script based on the meeting parameters and the set of user preferences.

* * * * *